(12) United States Patent
Laimböck

(10) Patent No.: US 6,880,510 B2
(45) Date of Patent: Apr. 19, 2005

(54) CYLINDER HEAD FOR AN INTERNAL COMBUSTION ENGINE

(75) Inventor: Franz Laimböck, Thal (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 10/485,312

(22) PCT Filed: Aug. 1, 2002

(86) PCT No.: PCT/AT02/00232

§ 371 (c)(1),
(2), (4) Date: Jan. 30, 2004

(87) PCT Pub. No.: WO03/012267

PCT Pub. Date: Feb. 13, 2003

(65) Prior Publication Data

US 2004/0182351 A1 Sep. 23, 2004

(30) Foreign Application Priority Data

Aug. 2, 2001 (AT) ..................... GM609/2001

(51) Int. Cl.[7] ................................ F02N 3/00
(52) U.S. Cl. .................. 123/188.8; 123/193.5
(58) Field of Search ............. 123/188.8, 193.5, 123/306

(56) References Cited

U.S. PATENT DOCUMENTS 3,368,259 A 2/1968 Stevens
5,165,374 A 11/1992 Chapman et al.
5,359,972 A 11/1994 Isaka
5,640,941 A 6/1997 Hazen et al.

FOREIGN PATENT DOCUMENTS

| DE | 1295274 | 5/1969 |
| EP | 1087115 | 3/2001 |
| FR | 1477125 | 3/1967 |
| GB | 2165886 | 4/1986 |

Primary Examiner—Noah P. Kamen
(74) Attorney, Agent, or Firm—Dykema Gossett PLLC

(57) ABSTRACT

The invention relates to a cylinder head (1) for an internal combustion engine with at least one inlet channel (3), which generates a swirling flow (S) in the combustion chamber (2), preferably curved in the direction of the swirling flow (S) with an external wall region (3a) and an internal wall region (3b) relative to the swirling flow (S). A valve seat ring (4) is arranged in the region of the opening (9) of the inlet channel (3) into the combustion chamber (2). According to the invention, a strong swirling flow (S) without significant reduction of the flow cross-section of the inlet channel (3) may be achieved whilst keeping the mechanical loading on the cylinder head to a minimum, whereby the external wall region (3a), in the region of the valve seat ring (4), is at least partly formed by a projection (11) of the cylinder head (1) within an internal surface (4a) of the valve seat ring (4), whereby the internal surface (4a) of the valve seat ring (4) extends beyond said projection (11).

7 Claims, 1 Drawing Sheet

CYLINDER HEAD FOR AN INTERNAL COMBUSTION ENGINE

BACKGROUND OF THE INVENTION

Figure 1:
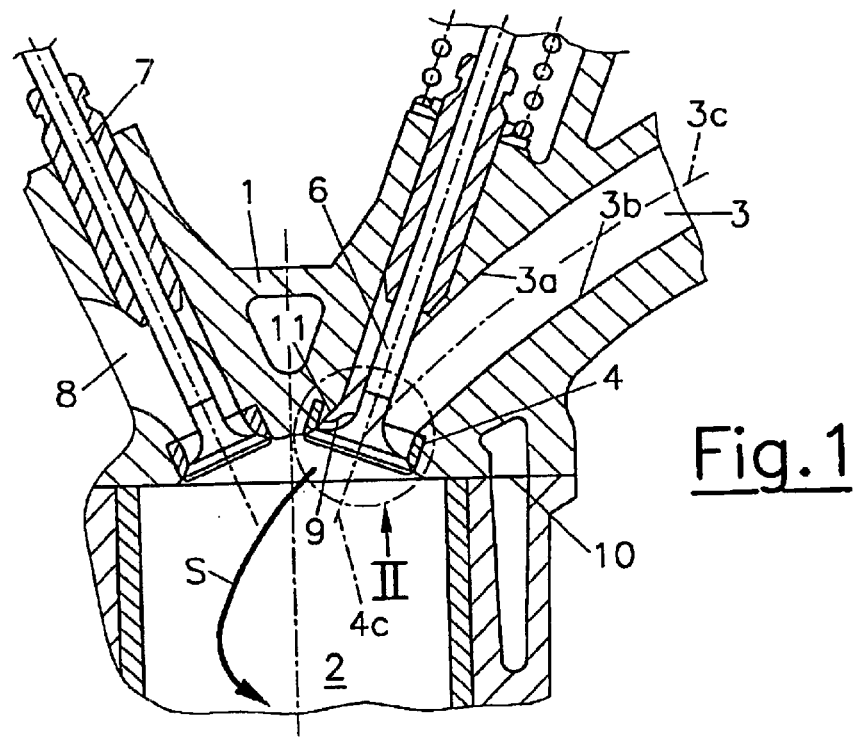

The invention relates to a cylinder head for an internal combustion engine with at least one intake port which generates a tumble flow in the combustion chamber, which channel is curved preferably in the direction of the tumble flow and comprises a wall region which is external relative to the tumble flow and an inner wall region, with a valve seat ring being arranged in the region of the opening of the intake port into the combustion chamber.

Cylinder heads with intake ports producing a tumble flow are known from U.S. Pat. No. 5,640,941 A, U.S. Pat. No. 5,165,374 A, U.S. Pat. No. 5,359,972 A or GB 2 165 886 A. Especially in the partial load region it is possible to favorably influence the progress of the combustion by the tumble flow and thus the fuel consumption and emission formation, with the highest possible tumble flow being desirable.

The amount of the tumble flow is relevantly determined by the position of the point of intersection of the central line of the intake port with the central line of the valve seat ring. The closer the point of intersection lies to the combustion chamber, the stronger the tumble flow. A strong inclination of the intake port relative to the central line of the valve seat ring allows for a strong tumble movement in the combustion chamber. A strong inclination of the central line of the flow of the intake port relative to the axis of the valve seat ring leads to the disadvantage however that the flow cross section of the intake port is strongly reduced, which has a disadvantageous effect especially in the full load range by a considerably reduced throughput. In designing the intake port it is therefore necessary to seek a compromise between high tumble flow in the partial load range and high throughput in the full load range.

From DE 1 295 274 B1 a gas exchange port of a cylinder head of an internal combustion engine is known in the opening region of which a valve seat ring is inserted which forms the inside curvature of the port wall at the core contact point. In one embodiment a wall region of the gas exchange port is formed in the region of the valve seat ring by an extension of the cylinder head within the valve seat ring. The valve seat ring is enclosed at least three sides directly by cylinder head material. This leads to multiple pressings and high mechanical stresses in this region.

SUMMARY OF THE INVENTION

It is the object of the present invention to further develop a cylinder head of the kind mentioned above in such a way that a strong tumble flow can be produced without any substantial reduction of the flow cross section of the intake port whilst preventing tension peaks in the cylinder head.

This occurs in accordance with the invention in such a way that the outer wall region in the area of the valve seat ring is formed at least partly by an extension of the cylinder head within an inner jacket surface of the valve seat ring, with the inner jacket surface of the valve seat ring being exposed relative to the extension. This exposure effectively helps prevent multiple pressings in the region of the valve seat ring. It is preferably provided that a fictitious extension of the port wall of the intake port in the region of the extension intersects the valve seat ring in the region of the inner jacket surface, with the line of intersection, when seen in the direction of the axis of the valve seat ring, preferably lying at least partly in a half of the inner jacket surface on the valve seat side.

This measure ensures that the point of intersection between the central line of intake port and the central line of the valve seat ring has a very small distance from the combustion chamber, thus producing a very strong tumble flow in the combustion chamber already at a low inclination of the central line of the intake port relative to the central line of the valve seat ring. This maintains the highest possible throughput in the full load region.

In a further development of the invention it is provided that the valve seat ring is provided with a sharp-edged chamfering upstream of its narrowest flow cross section in the transitional region to the intake port. This allows achieving a high tumble movement. As an alternative it may be provided that the valve seat ring is provided with a transitional radius continuously adjacent to the intake port upstream of its narrowest flow cross section in the transitional region to the intake port. This allows to provide the flow cross section of the intake port with a design in the region of the opening which is as large as possible and to substantially prevent flow detachments.

The cylinder head in accordance with the invention can be removed in an especially advantageous manner from a steel ingot mold having a casting incline, thus allowing for a very simple production.

BRIEF DESCRIPTION OF THE INVENTION

Figure 2:
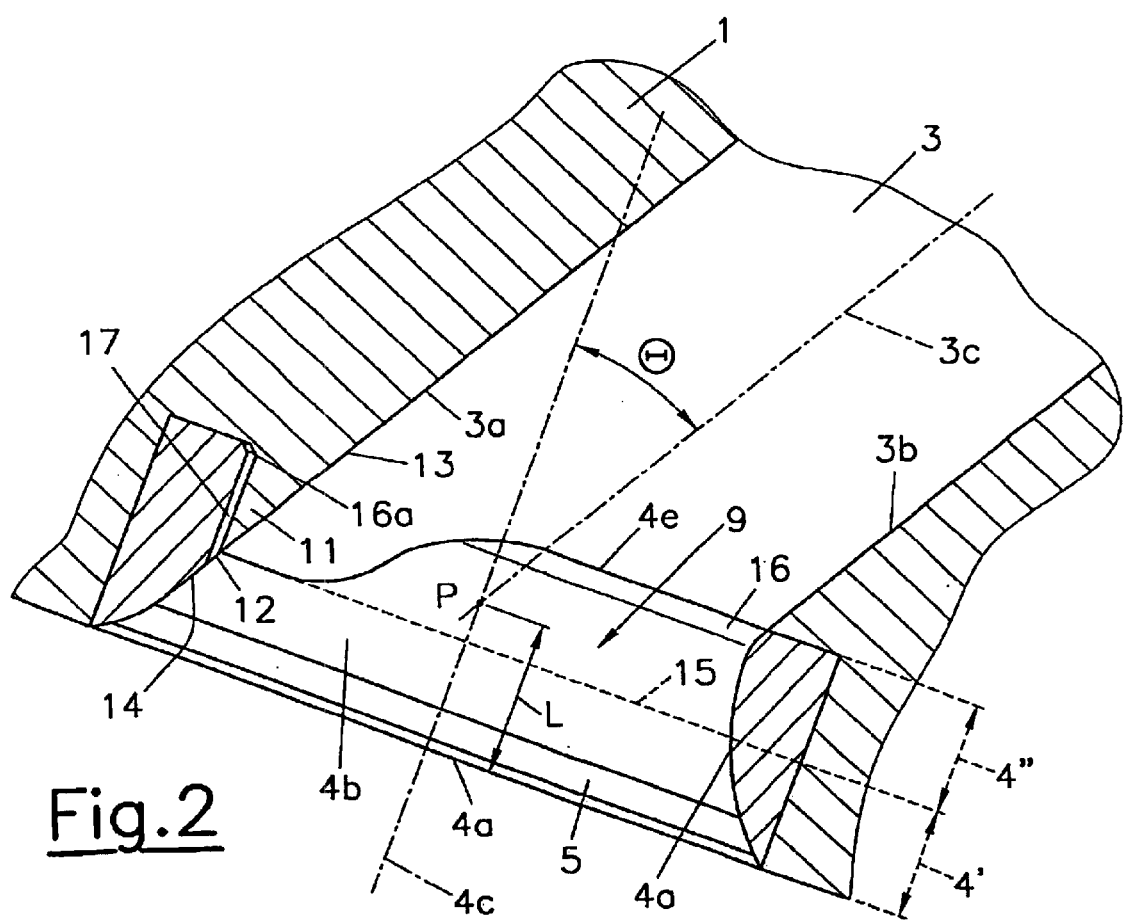

The invention is explained below in closer detail by reference to the drawings, wherein:

FIG. 1 shows a cylinder head in accordance with the invention in a cross-sectional view, and FIG. 2 shows the detail II of FIG. 1.

DETAILED DESCRIPTION OF THE INVENTION

The cylinder head 1 comprises at least one intake port 3 producing a tumble flow S in the combustion chamber 2. A valve seat ring 4 is arranged in the cylinder head 1 in the region of the opening 9 of the intake port 3 into the combustion chamber 3. The valve seat ring 4 forms the valve seat 5 for the intake valve 6. An exhaust valve is designated with reference numeral 7 and is used for controlling an exhaust port 8. The wall region of intake port 3 which is the outside one relative to the tumble flow S is designated with reference numerals 3a. The inner wall region is designated with reference numeral 3b. When seen in a normal sectional view relative to the central line 3c of the port, the outer wall region 3a is spaced further away from the cylinder head plane 10 than the inner wall region 3b.

In order to produce the strongest possible tumble flow S in the combustion chamber 2, the cylinder head 1 is provided in the region of the opening 9 of the intake port 3 into the combustion chamber 2 with an extension 11 which extends into the hollow space 4b opened by the inner jacket surface 4a. The extension 11 which is situated within the inner jacket surface 4a is configured as an extension of the outer wall region 3a.

The fictitious extension 12 of the channel wall 13 in the region of the extension 11 intersects the valve seat ring 4 in the region of the inner jacket surface 4a, with the lines of intersection 14 being situated at least partly in the half 4' of the valve seat ring 4 on the valve seat side. The half of the valve seat ring 4 which is averted from the valve seat 5 is designated with 4". The extension 11 per se extends at least partly up to a central plane 15 of the valve seat ring 4.

The extension 11 produces a displacement of the central line 3c of the intake port 3 in the direction of the cylinder head plane 10, thus displacing the point of intersection P between the central line 3c of the port and the central line 4c of the valve seat ring 4 towards the combustion chamber and reducing the distance L between the point of intersection P and the face surface 4d of the valve seat ring 4 on the combustion side.

Without the extension 11, a respective reduction of the distance L between the point of intersection P and the face surface 4d on the combustion chamber side which leads to an amplification of the tumble flow S could only be achieved via a respective relatively large angle of inclination Θ between the central line 3c of the port and the central line 4c of the valve seat ring 4, which would lead to the disadvantage of a considerable reduction in cross section of the intake port 3. The extension 11 allows for a strong tumbling movement S at a relatively low angle of inclination Θ, as a result of which a high throughput can be achieved in full-load operation.

As a further measure for producing the largest possible flow cross section of the intake port 3, the valve seat ring 4 comprises a transitional radius 16 according to the inclination of the inner wall region 3b in the region of the transition between the inner jacket surface 4a and the face surface 4e on the cylinder head side. Instead of the transitional radius 16 it is also possible to provide a sharp-edged chamfer 16a, as a result of which the tumbling movement S can be increased. For the purpose of illustrating this, FIG. 2 shows the valve seat ring 4 in its left half with a chamfering 16a and its right half with a transitional radius 16. In practice, however, the valve seat ring 4 is configured either with a circular transitional radius 16 or with a circular chamfering 16.

In order to avoid any double pressing of the valve seat ring 4, the valve seat ring 4 is exposed relative to the extension 11. The exposure is designated with reference numeral 17.

The extension 11 which is arranged integrally with the cylinder head 1 can be produced in one pressure casting process with the intake port 3.

What is claimed is:

1. A cylinder head for an internal combustion engine with at least one intake port which generates a tumble flow in a combustion chamber, which intake port is curved and comprises an external wall region which is external relative to the tumble flow and an inner wall region, with a valve seat ring being arranged in the region of an opening of the intake port into the combustion chamber and with the outer wall region in an area of the valve seat ring being formed at least partly by an extension of the cylinder head within an inner jacket surface of the valve seat ring, wherein the inner jacket surface of the valve seat ring is radially exposed relative to the extension.

2. The cylinder head according to claim 1, wherein the channel is curved in a direction of the tumble flow.

3. The cylinder head according to claim 1, wherein a fictitious extension of a port wall of the intake port in a region of the extension intersects the valve seat ring in a region of the inner jacket surface.

4. The cylinder head according to claim 1, wherein a line of intersection of the fictitious extension and the valve seat ring, when seen in a direction of an axis of the valve seat ring, lies at least partly in a half of the inner jacket surface on the valve seat side.

5. The cylinder head according to claim 1, wherein the intake port can be removed from a steel ingot mold having a casting incline.

6. The cylinder head according to claim 1, wherein the valve seat ring is provided with a transitional radius continuously adjacent to the intake port upstream of its narrowest flow cross section in a transitional region to the intake port.

7. The cylinder head according to claim 1, wherein the valve seat ring is provided with a sharp-edged chamfering upstream of its narrowest flow cross section in a transitional region to the intake port.

* * * * *